H. A. ARCHEREAU.
Preparing Oxygen.
No. 66,279.
Patented July 2, 1867.
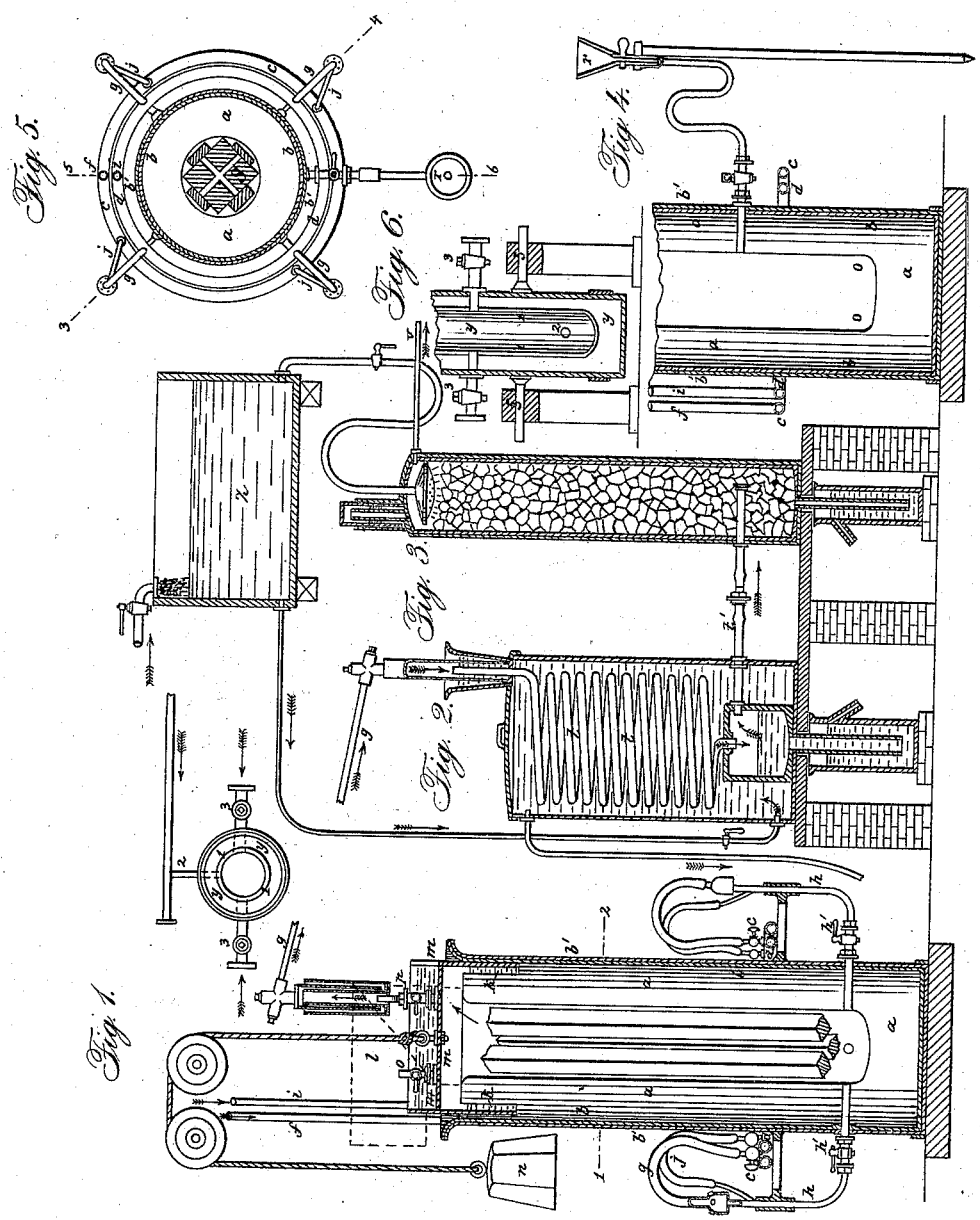
Witnesses:
Inventor:
Henri Adolph Archereau

UNITED STATES PATENT OFFICE.

HENRI ADOLPHE ARCHEREAU, OF PARIS, FRANCE, ASSIGNOR TO HIMSELF, J. M. O. CAMIN DESPALLES, JOSEPH DE SUSINI, AND E. O. STERN.

IMPROVED MODE OF PREPARING OXYGEN AND APPLYING THE SAME TO USEFUL PURPOSES.

Specification forming part of Letters Patent No. 66,279, dated July 2, 1867.

*To all whom it may concern:*

Be it known that I, HENRI ADOLPHE ARCHEREAU, chemist, of Paris, France, have invented Producing Oxygen on a Large Scale and Applying the Same to Various Purposes; and I do hereby declare that the following is a full, clear, and exact description of the same, reference being had to the annexed sheet of drawings, making a part of the same.

My invention consists in a new process of producing oxygen industrially or on a large scale by the decomposition of sulphuric acid through heat, and in the compression of oxygenic gas and its utilization to various purposes, principally to metallurgical operations.

I will summarily describe each of the constitutive parts of my invention.

Sulphuric acid of trade, either concentrated or not, on being raised to a certain temperature, is decomposed into water, steam, oxygen, and sulphurous acid, and this decomposition of sulphuric acid, through my new apparatus, I am going to describe as being the first part which I claim.

The operation is as follows, and effected by means of the apparatus hereinafter described: first, the producer or producing apparatus of my invention, the function of which is to decompose sulphuric acid at a certain temperature; second, the condenser or condensing apparatus, the function of which is to condense and collect the water vapors, chiefly those of sulphuric acid, which might have been left undecomposed; third, the washer, the object of which is to dissolve the sulphurous acid by setting at liberty the oxygen which passes beneath the receiver of a gas-meter. This washer may be dispensed with, in which case the oxygen and the sulphurous acid will go directly to the gas-meter, wherefrom they may be extracted to be submitted to compression, whereby the separation of the two gases will be obtained, and also the liquefaction of sulphurous acid alone, which would be discharged through a cock placed at the lower part of the compressing-cylinder. A slight washing of the oxygen is afterward effected for the purpose of clearing off the last vestiges of sulphurous acid. The sulphurous acid being compressed is set into communication with leaden chambers or other suitable apparatus, where it is transformed into sulphuric acid, to be used again for the fabrication of oxygen into this gas-producing apparatus.

The two apparatus—viz., the condenser and the washer—being of the public dominion, I do not claim them, but only their combination with the main apparatus—the producer.

This producer, the function of which is to decompose the sulphuric acid, consists in a furnace or stove, or the like, formed of a fire-clay cylinder or cupola, surrounded externally with a leaden shell and more resisting metallic inside jacket.

Instead of lead, several other substances might be applied which are unattackable by sulphuric acid, as certain stones, granite, porphyry, volcanic lava, india-rubber, gutta-percha, &c.

The leaden shell may not be strictly necessary, though I prefer using it, as it prevents the possible production of hydrogen by the contact of the acid against the metal walls, whereby water and iron are decomposed. The said shell is consequently intended to prevent explosion likely to result from the mixture of oxygen and hydrogen.

In said fire-clay cylinder or cupola are placed heavy and good conducting materials, such as cast-iron, &c., capable to absorb all the caloric evolved, so as to store in the apparatus a large amount of heat raised to a temperature sufficing to readily decompose sulphuric acid.

At the lower part of the furnace, and on its periphery, are placed two annular crowns, the one being in communication with a conduit of acid gas of carbon, and the other with a conduit of forced or compressed air. On each crown are various mouths for gas and compressed air, which, united two by two, will thereby constitute a certain number of blow-pipes or burners, the function of which is to develop in the cupola or center of the apparatus a sufficient heat to compensate for the caloric absorbed by the above-mentioned materials.

Any other suitable method of heating may be substituted for the one described—for instance, by utilizing the waste gases of high furnaces, or using either combustible gases or liquids, or even using solid combustible substances, by forming at the lower part of the apparatus a tightly-closed fire-box, in which would be a movable fuel, to be withdrawn after the apparatus is heated, at which time the fire-box is closed and the liquid to decompose introduced.

The upper part of the apparatus is to be tightly closed, preferably by water, so as to prevent any loss of the decomposed gases. The said water obturation may, by means of a counter-weight, be lowered or raised, according as the apparatus is working or not. It is, besides, covered at its upper part with a thin sheet of water, to prevent the lead from being melted.

When the furnace gets heated previous to the sulphuric acid being introduced the hydraulic closing is raised and is replaced by a sheet-iron chimney, through which are directed the products of combustion, and the draft quickened. When the furnace has attained the required temperature the water-closing is lowered, and then it may be proper to force into the apparatus a jet of steam to sweep and eject all the gases resulting from combustion. These escape through a purging-cock placed on the cover or lid. There is introduced afterward in the cupola, by means of a funnel, a portion of sulphuric acid, which is decomposed into oxygen, water, steam, and sulphurous acid.

The various products proceeding from decomposition escape from the producer to the condenser. When in the latter apparatus they will pass through a worm constantly kept cool, by which operation the water, steam, and sulphuric acid left undecomposed are condensed and collected at the lower part. The condenser is, therefore, intended to eliminate that portion of diluted sulphuric acid left undecomposed by the former apparatus, and to set at liberty the oxygenic gas and sulphurous-acid gas directed to the washer. The latter apparatus is filled with coke or other solid fragmented fuel, and a form of rose placed at the upper part constantly sprinkles a water shower thereon, the effect of which is to dissolve the sulphurous-acid gas, thus setting at liberty the oxygen, which is directed beneath the receiving-bell of a gas-meter. The sulphurous acid, dissolved and diluted, is collected at the lower part of the apparatus, thence to be conveyed to any suitable place.

The oxygenic gas thus produced and stored up I utilize to various purposes, principally to metallurgic operations, to the heating of cupolas, &c.; and I claim these very appropriations and the means employed for such purposes.

In order to obtain all the useful effect of oxygen injected from beneath a metallurgic or other fire-box, I first submit this gas to a strong pressure, whereby it may be raised sometimes to ten atmospheres, in cylinders which are able to resist such tension. If I inject this thus compressed gas from beneath a furnace—a cupola, for instance—an excessive temperature is thereby determined, which can melt all the materials, and which could not even resist the apparatus itself were the operation to be long-lasting. Now, it is exactly the short duration of the operation, resulting from the quick injection of the oxygen, which I claim, as it will allow, first, a heating at very high temperature, a complete heating on the whole area of the fuel, and, in the second place, using fire-clay cupolas lined with a still more refractory substance. The metal to be melted, placed in this cupola, being good conductor and absorber of the developed caloric, will be so quickly liquefied and melted that the materials the cupola is made of, being themselves bad conductors, will have no time to enter into fusion. Further, the inside lining, still more refractory, being submitted alone to the strongest temperature, the whole repair will consist, after each operation, to line anew the cupola with a fresh layer of the same more refractory substance. This more refractory substance is composed of a pulpy mass or agglomerate of Paris coal, coal, anthracite, &c., or a mass having for a base, instead of the above stuffs, lime and magnesia.

Sometimes the lining or plastering is formed with the above-mentioned substances mixed with a residue of coal-tar. This internal lining is generally baked or burnt by the little fire of the cupola; but the baking is to be so far advanced, at least when the oxygen is introduced, as to be completed before the melting operation of iron is over.

The iron thus melted and liquefied is not left the time to be carbureted, which prevents the production of cast-iron. It may, while in the liquid state, be either cast in molds, like cast-iron, or be transformed into steel by the adjunction of a certain amount of cast-iron in fusion, or by causing a reaction of cyanides.

In the annexed drawings I have represented the various apparatus intended for the production of oxygenic gas.

Figure 1 is a central vertical section of the producer or decomposing apparatus of sulphuric acid through the line 3 4 of Fig. 5. Fig. 2 is a vertical section of the refrigeratory or condensing apparatus. Fig. 3 is a vertical section of the washer or washing apparatus. Fig. 4 is a similar central vertical section of the decomposing apparatus through the line 5 6 of Fig. 5. Fig. 5 is a horizontal section of the decomposing apparatus through the line 1 2 of Fig. 1, and Figs. 6 and 7 show a sectional view and a plan of a cupola.

In all these figures the same letters and marks of reference stand for the like parts where they recur.

$a$, fire-clay furnace or cupola of the decomposing apparatus. It is surrounded all over with a leaden envelope or shell, $b$, and a lining, $b'$. At the lower part of the apparatus there are two annular crowns, $c$ and $d$, the one $c$ receiving from a conduit, $f$, oxide gas of carbon or other combustible gases, which it conveys and distributes through pipes $g$ to the blow-pipes $h$. The other crown, $d$, receives from tube $i$ compressed air, which is likewise conveyed and distributed through pipes $j$ to the said blow-pipes $h$.

The apparatus may be provided with a draft-chimney, or it may be sufficiently elevated to, by itself, constitute a chimney, so as to dispense with the use of forced air.

$h'$, cocks placed between the blow-pipe and the producing apparatus of oxygen. These are shut during the decomposition of sulphuric acid. They are only kept open during the heating time. The heating by gas, as described, is the fittest for the march of the operation. I reserve, however, any other heating process, either by using the waste gases of industrial furnaces or any other fuel.

At the upper part of the apparatus there is an annular channel, $k$, filled with water, for the purpose of forming a hydraulic closing of the furnace.

$l$, metallic chimney, (shown in red,) placed over the cupola $a$ when the hydraulic cover is up and when the heating operation is commencing. This chimney is intended to direct away the products of combustion and quicken the draft.

$m$, hydraulic cover or lid, made to be raised or lowered by means of the counter-weight $n$; $o$, purging-cock; $p$, cock for letting out the gases proceeding from the decomposition of sulphuric acid. These gases are conveyed into the condenser through the tube $g$, which is removed previous to the hydraulic lid or cover $m$ being raised.

$r$, funnel for introducing sulphuric acid. This introduction may take place anywhere, and I do not limit myself to any particular spot or place therefor in the apparatus. Sulphuric acid is decomposed on the heavy and good conducting materials placed in the cupola $a$, which materials have been absorbing caloric, and now yield it thereto.

$t$, worm of the condenser. It is constantly cooled. It condenses the water-steam and collects at the lower part of the apparatus the diluted sulphuric acid thereof. The oxygen and sulphurous acid are then passing through the tube $t'$ into the washer represented in Fig. 3, which is filled with coke or other solid unalterable body.

$u$, water-pot rose, emitting a water-shower to dissolve the sulphurous-acid gas. On the lower part of the apparatus is collected a dissolution of sulphurous acid into pure water, or water charged with sulphurous acid. The oxygenic gas thus cleared away is conveyed through the tube $v$ beneath the receiving-bell of a gas-meter.

$x$, water-tank, feeding the washer and condenser. This water may be alkalized at need, so as to render more quick and complete the absorbing effect of sulphurous-acid gas. After the oxygenic gas is stored up it is firmly compressed into metallic cylinders, and then distributed and utilized either for heating cupolas or for other purposes.

$y$, cupola rotating on two trunnions, $z$. This fire-clay cupola is lined inside with a still more refractory layer, 1, which is to undergo the whole effect of heat.

2, pipe for the introduction of the oxygenic-gas steam; 3, cock-pipes for introducing forced air into the cupola. Through these pipes may be forced either air alone, or oxygenized air, or oxygen alone.

I have described various processes for producing and utilizing oxygen resulting from a fabrication on a large scale. Now, the protoxide of azote being a gas which, by its nature and properties, is the nearer akin to oxygen, I can also produce this gas with my apparatus by injecting, for instance, into it nitrate of ammonia dissolved in very little water. This protoxide of azote once produced, I may apply it to the same industrial purposes as succedaneum of oxygen, and by the same means.

Sulphuric acid may be introduced into the generator of oxygenic gas in the liquid either in cold or hot state, as also in the state of vapor.

When two generating apparatus are to be had, the waste heat of the one may serve to heat the sulphuric acid to be introduced in the other.

It is proper to make, preferably, use of a platina tube for introducing the acid to be decomposed.

Claims.

1. The process of decomposing sulphuric acid at its various degrees, as found in trade, for obtaining oxygen therefrom, substantially as described.

2. The hereinabove described and represented apparatus, and especially the apparatus for decomposing sulphuric acid, whatever may be the mode of heating employed.

3. The compressing process for the better utilization of oxygenic gas.

4. The application and utilization of oxygen to all purposes, especially to metallurgic operations and to producing excessive high temperatures, allowing of the most refractory bodies being melted without melting their containing capacities.

5. The process for melting iron without carbureting or production of cast-iron, in the manner and for the purposes hereinabove specified.

HENRI ADOLPHE ARCHEREAU.

Witnesses:
   DEMOS,
   J. GALLOIS.